(12) United States Patent
Kang et al.

(10) Patent No.: US 10,699,169 B2
(45) Date of Patent: Jun. 30, 2020

(54) MACHINE LEARNING-BASED OBJECT DETECTION METHOD AND APPARATUS

(71) Applicant: SAMSUNG SDS CO., LTD., Seoul (KR)

(72) Inventors: Sun Ah Kang, Seoul (KR); Sang Hak Lee, Seoul (KR); Bo Youn Kim, Seoul (KR); Seong Jong Ha, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 23 days.

(21) Appl. No.: 16/134,436

(22) Filed: Sep. 18, 2018

(65) Prior Publication Data

US 2019/0130230 A1    May 2, 2019

(30) Foreign Application Priority Data

Oct. 26, 2017    (KR) .................... 10-2017-0140044

(51) Int. Cl.
*G06K 9/66*    (2006.01)
*G06K 9/00*    (2006.01)
*G06K 9/62*    (2006.01)

(52) U.S. Cl.
CPC .......... *G06K 9/66* (2013.01); *G06K 9/00228* (2013.01); *G06K 9/00771* (2013.01); *G06K 9/6284* (2013.01); *G06K 9/6288* (2013.01)

(58) Field of Classification Search
CPC .... G06K 9/66; G06K 9/00228; G06K 9/6284; G06K 9/6288
USPC ....................................................... 382/159
See application file for complete search history.

(56) References Cited

U.S. PATENT DOCUMENTS

| | | | |
|---|---|---|---|
| 6,999,625 B1 | 2/2006 | Nelson | |
| 9,076,065 B1* | 7/2015 | Vijayanarasimhan | ...................... G06K 9/6256 |
| 2006/0200347 A1* | 9/2006 | Kim | ........................ G10L 15/22 704/236 |
| 2010/0177968 A1* | 7/2010 | Fry | ....................... A61B 5/0452 382/224 |
| 2012/0141017 A1* | 6/2012 | Krupka | .............. G06K 9/00228 382/159 |

(Continued)

FOREIGN PATENT DOCUMENTS

| | | |
|---|---|---|
| JP | 2012-190262 A | 10/2012 |
| WO | 2010/032298 A1 | 3/2010 |

*Primary Examiner* — Wednel Cadeau
(74) *Attorney, Agent, or Firm* — Sughrue Mion, PLLC

(57) ABSTRACT

Provided is a machine learning-based object detection method performed by an object detection apparatus. the method comprises constructing an object detection model by performing machine learning on a training image set, wherein the object detection model is a model for detecting a target object in an input image based on the result of comparing a confidence score for the target object with a threshold value, obtaining an input image given a detection result for the target object, wherein the obtained input image is an image not included in the training image set, predicting one or more object regions, in which the target object exists, in the obtained input image by using the object detection model, classifying a region not matching the detection result among the predicted object regions as a false detection region; and adjusting the threshold value of the object detection model based on a confidence score of the false detection region.

20 Claims, 16 Drawing Sheets

(56) References Cited

U.S. PATENT DOCUMENTS

2014/0286527 A1* 9/2014 Harthattu ........... G06K 9/00228
382/103
2017/0206431 A1 7/2017 Sun et al.

* cited by examiner

MACHINE LEARNING-BASED OBJECT DETECTION METHOD AND APPARATUS

This application claims the benefit of Korean Patent Application No. 10-2017-0140044, filed on Oct. 26, 2017, in the Korean Intellectual Property Office, the disclosure of which is incorporated herein by reference in its entirety.

BACKGROUND

1. Field

The present disclosure relates to a machine learning-based object detection method and apparatus, and more particularly, to a method of accurately detecting a target object in an input image obtained in a new environment without retraining an object detection model constructed through machine learning, and an apparatus for performing the method.

2. Description of the Related Art

An intelligent image analysis system is a system that analyzes, in real time, image information collected from an image capturing apparatus such as a closed circuit television (CCTV) to detect, track and recognize a target object and provides various analysis information. With the spread of CCTVs and the advancement of image analysis technology, the intelligent image analysis system is being established and utilized in various fields.

Of a series of image analysis operations performed by the intelligent image analysis system, target object detection is the most basic process of image analysis and is the most important work to guarantee the reliability of analysis information. Various algorithms have been proposed for target object detection, but a machine learning-based object detection method is drawing a lot of attention due to its high accuracy.

In general, a machine learning-based object detection model learns images obtained in a limited environment and determines a threshold value used as a criterion for detecting a target object. In addition, the machine learning-based object detection model detects the target object using the determined threshold value. In this case, if the threshold value determined through learning in the limited environment is uniformly applied to new environments, false detection (false positive) of the target object may increase. In particular, since object detection is the first step in intelligent image analysis in intelligent image analysis systems, false detection of the target object may become a major cause of degradation of the overall system performance.

In order to solve such a false detection problem, the object detection model may be retrained based on images obtained in a new environment. However, since retraining of the object detection model requires a lot of time and cost in a series of processes such as acquisition, refinement, and learning of a training dataset, it is very inefficient to perform retraining every time the application environment is changed.

Therefore, there is a need for an object detection method that can accurately detect a target object without retraining the object detection model even when the application environment is changed.

SUMMARY

Aspects of the present disclosure provide a method of accurately detecting a target object by adjusting a threshold value without retraining a trained object detection model when an application environment of the trained object detection model is changed, and an apparatus for performing the method.

Aspects of the present disclosure also provide a method of determining an optimum threshold value for accurately detecting a target object without retraining, and an apparatus for performing the method.

Aspects of the present disclosure also provide a method of accurately selecting a target classifier whose threshold value is to be adjusted when the object detection model is composed of a plurality of classifiers, and an apparatus for performing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a machine learning-based object detection method performed by an object detection apparatus. The method comprises constructing an object detection model by performing machine learning on a training image set, wherein the object detection model is a model for detecting a target object in an input image based on the result of comparing a confidence score for the target object with a threshold value, obtaining an input image given a detection result for the target object, wherein the obtained input image is an image not included in the training image set, predicting one or more object regions, in which the target object exists, in the obtained input image by using the object detection model, classifying a region not matching the detection result among the predicted object regions as a false detection region; and adjusting the threshold value of the object detection model based on a confidence score of the false detection region.

According to another aspect of the present disclosure, there is provided an object detection apparatus comprising a hardware processor and a memory configured to store one or more programs executed by the hardware processor, wherein the programs comprise instructions which, when executed by the hardware processor, cause the hardware processors to perform constructing an object detection model by performing machine learning on a training image set, wherein the object detection model is a model for detecting a target object in an input image based on the result of comparing a confidence score for the target object with a threshold value, obtaining an input image given a detection result for the target object, wherein the obtained input image is an image not included in the training image set, predicting one or more object regions, in which the target object exists, in the obtained input image by using the object detection model, classifying a region not matching the detection result among the predicted object regions as a false detection region and adjusting the threshold value of the object detection model based on a confidence score of the false detection region.

According to another aspect of the present disclosure, there is provided a non-transitory computer-readable storage medium that stores a computer program which, when executed by a computing apparatus, causes the computing apparatus to perform constructing an object detection model by performing machine learning on a training image set, wherein the object detection model is a model for detecting a target object in an input image based on the result of comparing a confidence score for the target object with a threshold value, obtaining an input image given a detection result for the target object, wherein the obtained input image is an image not included in the training image set, predicting one or more object regions, in which the target object exists, in the obtained input image by using the object detection model, classifying a region not matching the detection result among the predicted object regions as a false detection region and adjusting the threshold value of the object detection model based on a confidence score of the false detection region.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
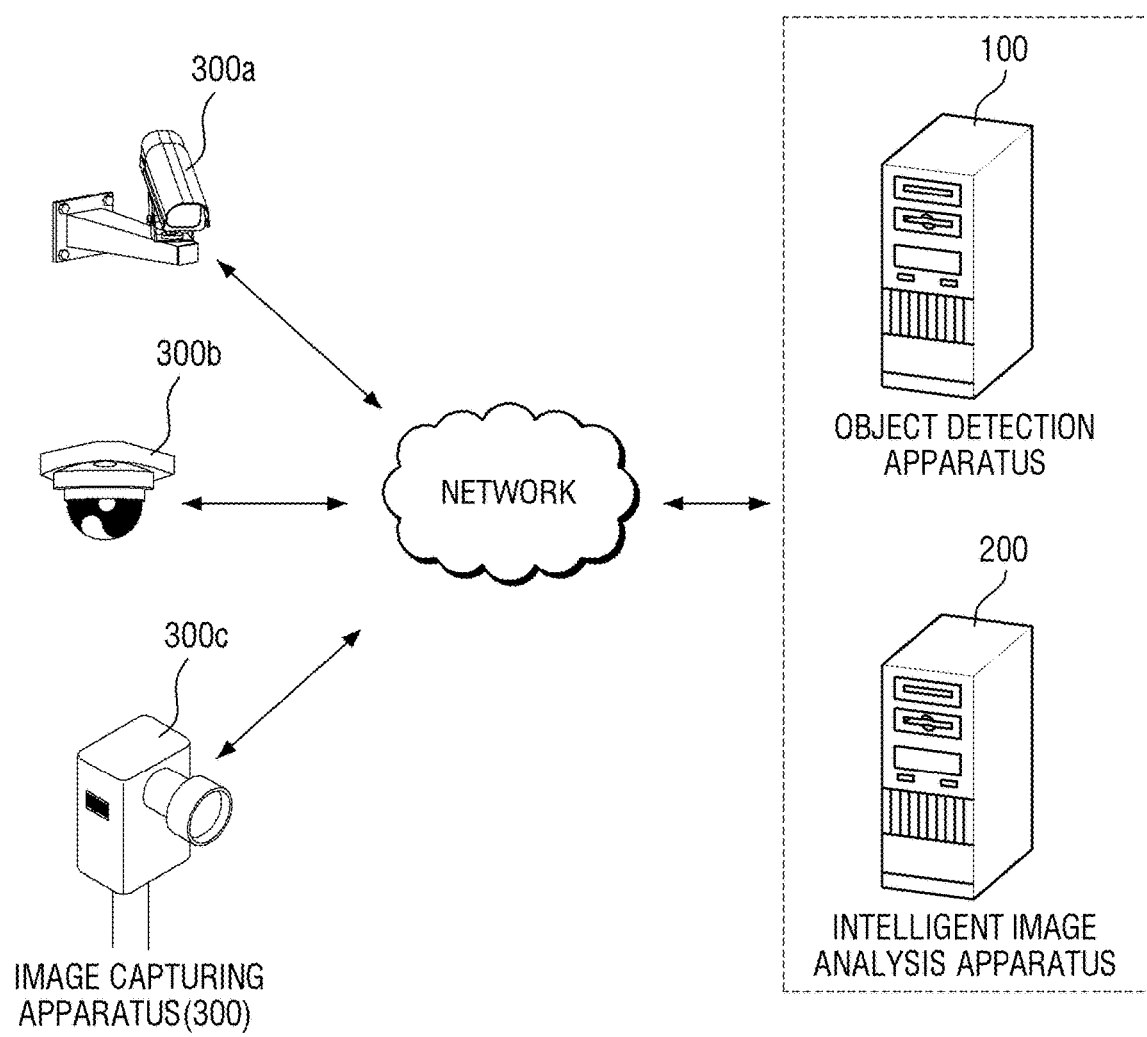
FIG. 1 illustrates the configuration of an intelligent image analysis system according to an embodiment.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Prior to describing the present disclosure, certain terms used herein will be clarified.

A target object, as used herein, means a person or object to be detected. In addition, the target object may mean all or part of an object. For example, the target object may be a person's face. However, this example is intended to illustrate some embodiments of the present disclosure, and the present disclosure is not limited to this example.

A machine learning-based object detection model, as used herein, is a model that is trained using a machine learning algorithm and predicts an object region, in which a target object exists, in an input image by using a threshold value. For example, the object detection model may be a model that predicts, in an input image, a region where a confidence score for a target object is equal to or greater than a threshold value as an object region. However, this example is intended to illustrate some embodiments of the present disclosure, and the present disclosure is not limited to this example.

A threshold value, as used herein, means a value used as a criterion for detecting a target object. For example, the threshold value may be set to one specific value. For another example, the threshold value may be set to a specific range of values. However, the above examples are intended to illustrate some embodiments of the present disclosure, and the present disclosure is not limited to these examples.

A confidence score, as used herein, is a value output from a machine learning-based object detection model for an input image and may be understood as a value indicating the probability that a target object exists in an input image or a specific region of the input image. Depending on the degree of scaling, the confidence score may have various ranges of size values, such as a range of 0 to 1 and a range of 0 to 100.

An environment, as used herein, may be interpreted as a comprehensive term including all factors that affect the detection of a target object in an input image. For example, the environment may include all factors that affect target object detection, such as a photographing area, illuminance, and image quality. However, this example is intended to illustrate some embodiments of the present disclosure, and the present disclosure is not limited to this example.

Hereinafter, embodiments of the present disclosure will be described in detail with reference to the accompanying drawings.

FIG. 1 illustrates the configuration of an intelligent image analysis system according to an embodiment.

Referring to FIG. 1, the intelligent image analysis system may be configured to include an object detection apparatus 100, an intelligent image analysis apparatus 200, and at least one image capturing apparatus 300.

However, this is merely an embodiment for achieving the objectives of the present disclosure, and some components can be added or removed as needed. In addition, it should be noted that the components of the intelligent image analysis system illustrated in FIG. 1 are functionally distinct components and that one or more components can be integrated with each other in an actual physical environment. For example, the object detection apparatus 100 and the intelligent image analysis apparatus 200 may be implemented as different logic elements within the same apparatus. Each component of the intelligent image analysis system will now be described.

In the intelligent image analysis system, the object detection apparatus 100 is a computing apparatus that performs object detection in an input image using an object detection model constructed through machine learning. In the current embodiment, the input image may be received from at least one image capturing apparatus 300. In other embodiments, however, the input image can be obtained in any way.

The computing apparatus may be a notebook computer, a desktop computer, or a laptop computer. However, the computing apparatus is not limited to these examples and can be implemented as any type of apparatus having a computing function and a communication function. If image analysis is performed in real time, the object detection apparatus 100 may be implemented as a high-performance server computing apparatus.

According to an embodiment, the object detection apparatus 100 determines whether false detection of a target object occurs based on an input image given a detection result for the target object. In addition, in response to the determination that the false detection of the target object occurs, the object detection apparatus 100 may dynamically adjust a threshold value used as a criterion for detecting the target object. For example, when the object detection apparatus 100 is applied to a new environment, the threshold value may be dynamically adjusted based on an input image of the new environment which is given a detection result. According to the current embodiment, the problem of false detection of the target object can be solved without retraining about the new environment. Therefore, the computing cost and time cost required for retraining can be reduced, and the accuracy and reliability of target object detection can be improved. The current embodiment will be described in detail later with reference to FIGS. 7 through 9E.

In the intelligent image analysis system, the intelligent image analysis apparatus 200 is a computing apparatus that performs intelligent image analysis, such as recognition, tracking, etc. of a target object, based on the detection result of the object detection apparatus 100.

In the intelligent image analysis system, the image capturing apparatus 300 is an apparatus for generating image information about a surveillance area. The image capturing apparatus 300 may be implemented as, for example, a closed circuit television (CCTV). However, the image capturing apparatus 300 is not limited to the CCTV and can be implemented as any apparatus that can generate image information about a surveillance area. In particular, in FIG. 1, a case where the intelligent image analysis system includes a plurality of image capturing apparatuses 300a. 300b and 300c is illustrated as an example.

Each component of the intelligent image analysis system may communicate over a network. The network can be implemented as any kind of wired/wireless network such as a local area network (LAN), a wide area network (WAN), a mobile radio communication network, or a wireless broadband Internet (Wibro).

Until now, the intelligent image analysis system according to the embodiment has been described with reference to FIG. 1. The configuration and operation of the object detection apparatus 100, which is a component of the intelligent image analysis system, will now be described with reference to FIGS. 2 through 6.

Figure 2:
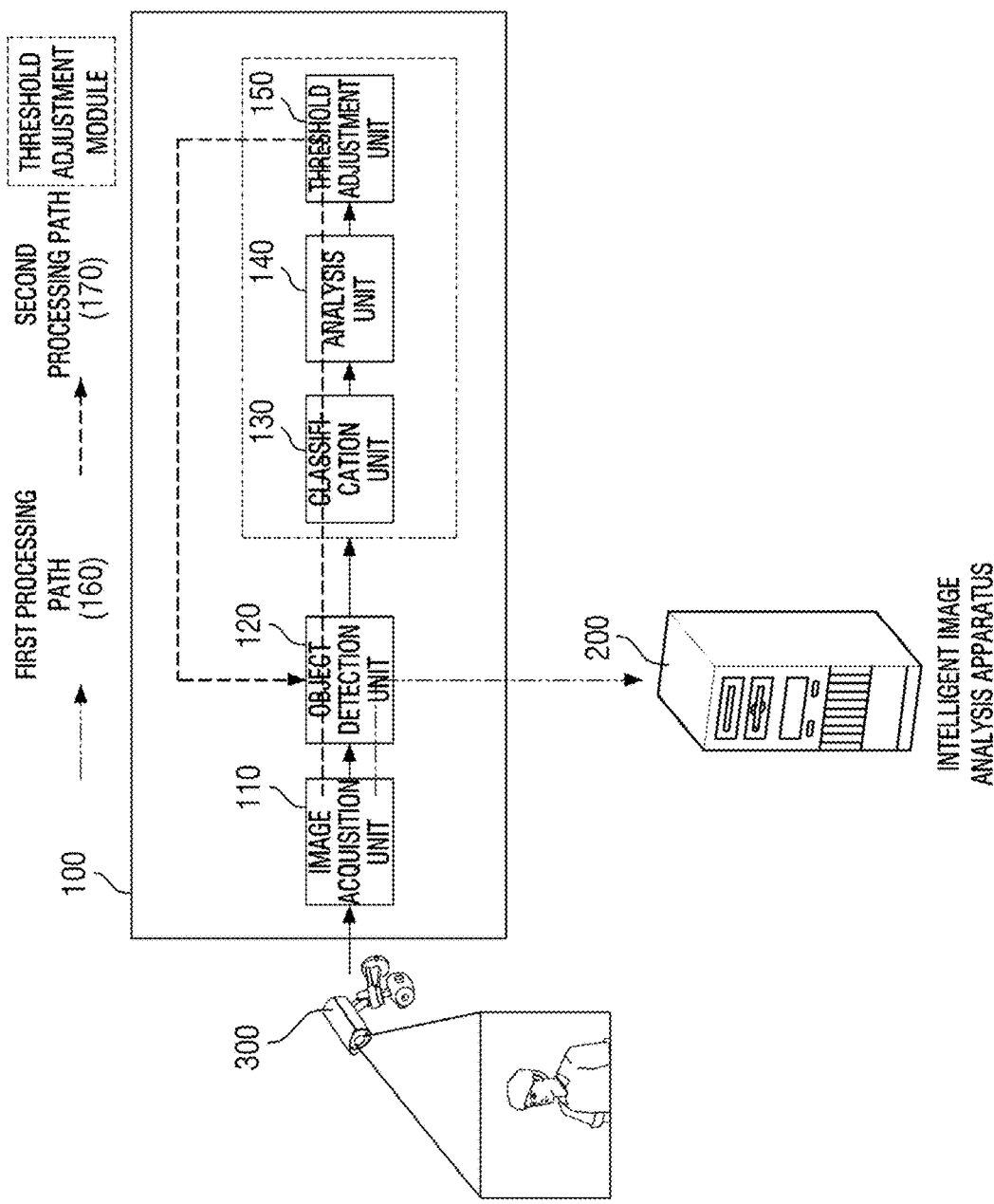
FIGS. 2 and 3 are block diagrams of a machine learning-based object detection apparatus according to an embodiment.
Figure 3:
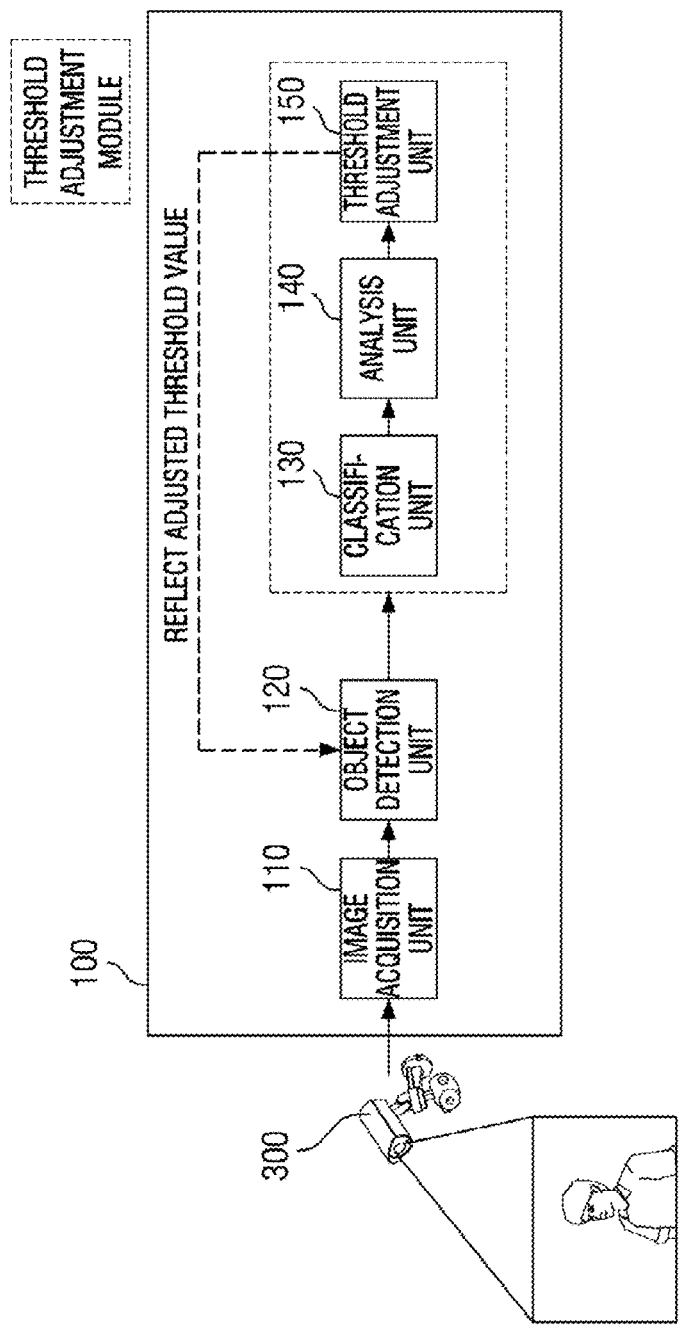

FIGS. 2 and 3 are block diagrams of a machine learning-based object detection apparatus 100 according to an embodiment. In particular, in FIG. 2, a processing path for each operation mode of the object detection apparatus 100 is also illustrated.

Referring to FIG. 2, the object detection apparatus 100 may operate in two modes. A first mode is a mode for detecting a target object in an input image not given a detection result for the target object. When the object detection apparatus 100 operates in the first mode, the detection of the target object is performed according to a first processing path 160, and the detection result is provided to the intelligent image analysis apparatus 200.

A second mode is a mode for adjusting a threshold value used to detect a target object using an input image given a detection result for the target object. When the object detection apparatus 100 operates in the second mode, the detection of the target object, the adjustment of the threshold value, etc. are performed according to a second processing path 170.

Depending on embodiments, the first mode and the second mode may be determined automatically. For example, when a first input image not given a detection result is input, the object detection apparatus 100 may automatically operate in the first mode. In the opposite case, the object detection apparatus 100 may automatically operate in the second mode. The operation of each of components 110 through 150 will now be described based on the assumption that the object detection apparatus 100 operates in the second mode. However, even when the object detection apparatus 100 operates in the first mode, the operation of an object detection unit 120 is not greatly changed.

Referring to FIG. 3, the object detection apparatus 100 may include an image acquisition unit 110, the object detection unit 120, a classification unit 130, an analysis unit 140, and a threshold adjustment unit 150. In FIG. 3, only the components related to the embodiment are illustrated. Therefore, it will be understood by those of ordinary skill in the art to which the present disclosure pertains that other general-purpose components can be included in addition to the components illustrated in FIG. 3. In addition, it should be noted that the components of the object detection apparatus 100 illustrated in FIG. 3 are functionally distinct components and that one or more components can be integrated with each other in an actual physical environment.

Referring to each component, the image acquisition unit 110 obtains an input image on which object detection is to be performed. For example, the image acquisition unit 110 may receive an input image from an image capturing apparatus 300. However, this example is intended to illustrate some embodiments of the present disclosure, and the present disclosure is not limited to this example.

The object detection unit 120 detects a target object in an input image provided by the image acquisition unit 110.

According to an embodiment, the object detection unit 120 detects an object region, in which a target object exists, in an input image using a machine learning-based object detection model. Here, the input image may be an input image given a detection result. However, if the object detection apparatus 100 operates in the first mode, the input image may be an image not given a detection result.

Specifically, the object detection unit 120 compares a confidence score for the target object output from the object detection model with a threshold value and detects the object region, in which the target object exists, in the input image based on the comparison result. Here, the threshold value may be a value that is dynamically adjusted by the threshold adjustment unit 150 according to the detection environment.

For example, the object detection unit 120 may detect, in the input image, a region in which the confidence score is equal to or greater than the threshold value as the object region in which the target object exists. Alternatively, the object detection unit 120 may detect a region in which the confidence score is equal to or greater than the threshold value as a candidate object region and, when n or more candidate object regions (where n is a natural number equal to or greater than 1) satisfying a specified condition are detected, detect the n or more candidate object regions as the object region. This will be further described later with reference to FIGS. 8A through 8F. The above example is intended to illustrate some embodiments of the present disclosure, and the present disclosure is not limited to this example.

Figure 4:
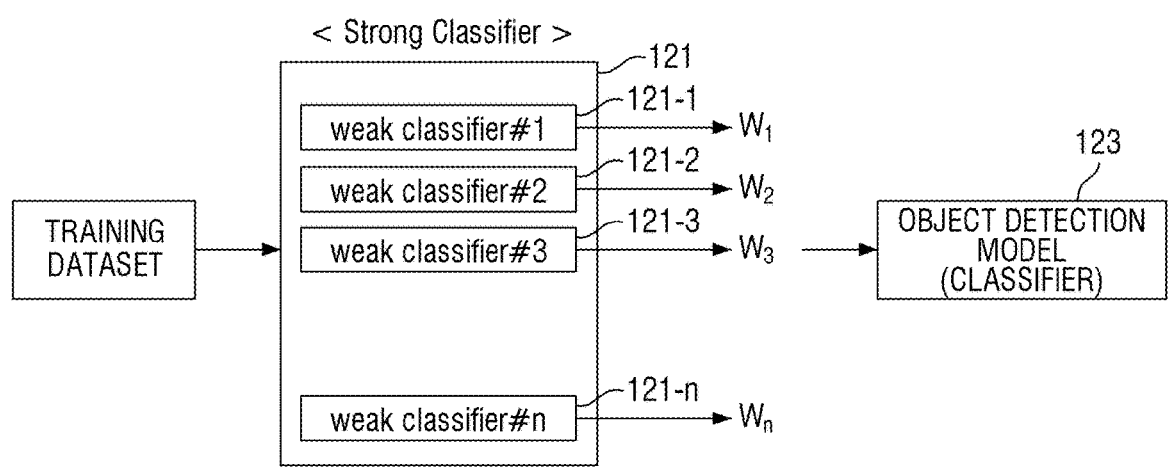
FIGS. 4 and 5 illustrate object detection models that can be referred to in some embodiments.

According to an embodiment, as illustrated in FIG. 4, an object detection model 123 may be a model trained based on an AdaBoost algorithm. The type of machine learning algorithm can vary depending on embodiments. For reference, the AdaBoost algorithm is a machine learning algorithm that constructs at least one strong classifier 121 by learning a plurality of weak classifiers 121-1 through 121-*n*. Since the AdaBoost algorithm is an algorithm well known in the art, a detailed description thereof will be omitted.

Figure 5:
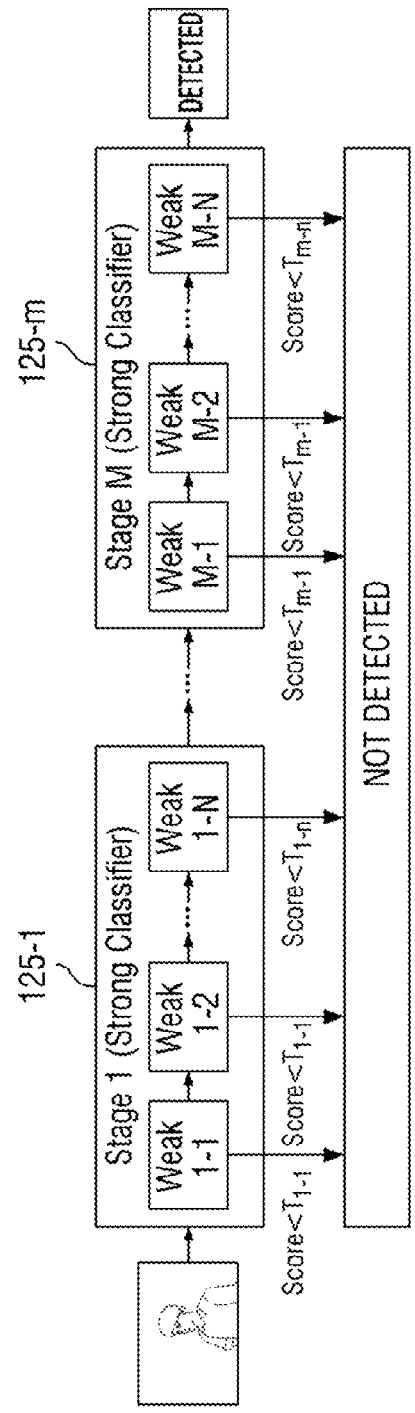

In addition, according to an embodiment, a plurality of classifiers (e.g., weak classifiers and strong classifiers) may be configured in a cascade structure as illustrated in FIG. 5. In particular, in FIG. 5, m strong classifiers 125-1 through 125-*m* are configured in a cascade structure, and n weak classifiers constituting each of the strong classifiers 125-1 through 125-*m* are also configured in a cascade structure. However, the example illustrated in FIG. 5 is intended to illustrate some embodiments of the present disclosure, and the present disclosure is not limited to this example.

The classification unit 130 classifies an object region detected by the object detection unit 120 as a normal detection region, a false detection region, or a non-detection region. The classification unit 130 may perform the classification using a given detection result for a target object. Specifically, the classification unit 130 classifies a region matching the detection result among a plurality of object regions as a normal detection region and classifies a region not matching the detection result as a false detection region. In addition, the classification unit 130 may classify a region, which exists in the detection result but is not detected as an object region, as a non-detection region.

The analysis unit 140 analyzes the confidence score of each region and provides various analysis results. For example, the analysis unit 140 may provide a maximum, minimum, $k^{th}$ (where k is a natural number equal to or greater than 1) confidence score for object regions (e.g., a normal region, a false detection region, and a non-detection region) or a region having the confidence score as an analysis result. For another example, when an object region is composed of a plurality of candidate object regions, the analysis unit 140 may provide a maximum, minimum, $k^{th}$ confidence score for the candidate object regions or a candidate object region having the confidence score as an analysis result. However, the above examples are intended to illustrate some embodiments of the present disclosure, and the present disclosure is not limited to these examples.

Based on the analysis result of the analysis unit 140, the threshold adjustment unit 150 adjusts the threshold value used by the object detection unit 120, specifically, by the object detection model. The operation of the analysis unit 140 and the threshold adjustment unit 150 will be described in detail later with reference to FIGS. 9A through 9E.

Although not illustrated in FIG. 3, the object detection apparatus 100 may further include a retraining unit (not illustrated). The retraining unit (not illustrated) may retrain a machine learning-based object detection model under a predetermined condition. The operation of the retraining unit will be described later with reference to FIGS. 10 and 11.

Each component described with reference to FIGS. 2 and 3 may be, but is not limited to, a software component or a hardware component such as a Field Programmable Gate Array (FPGA) or Application Specific Integrated Circuit (ASIC). A component may advantageously be configured to reside on the addressable storage medium and configured to execute on one or more processors. The functionality provided for in the components may be further separated into additional components or combined into a single component that performs certain functions.

Figure 6:
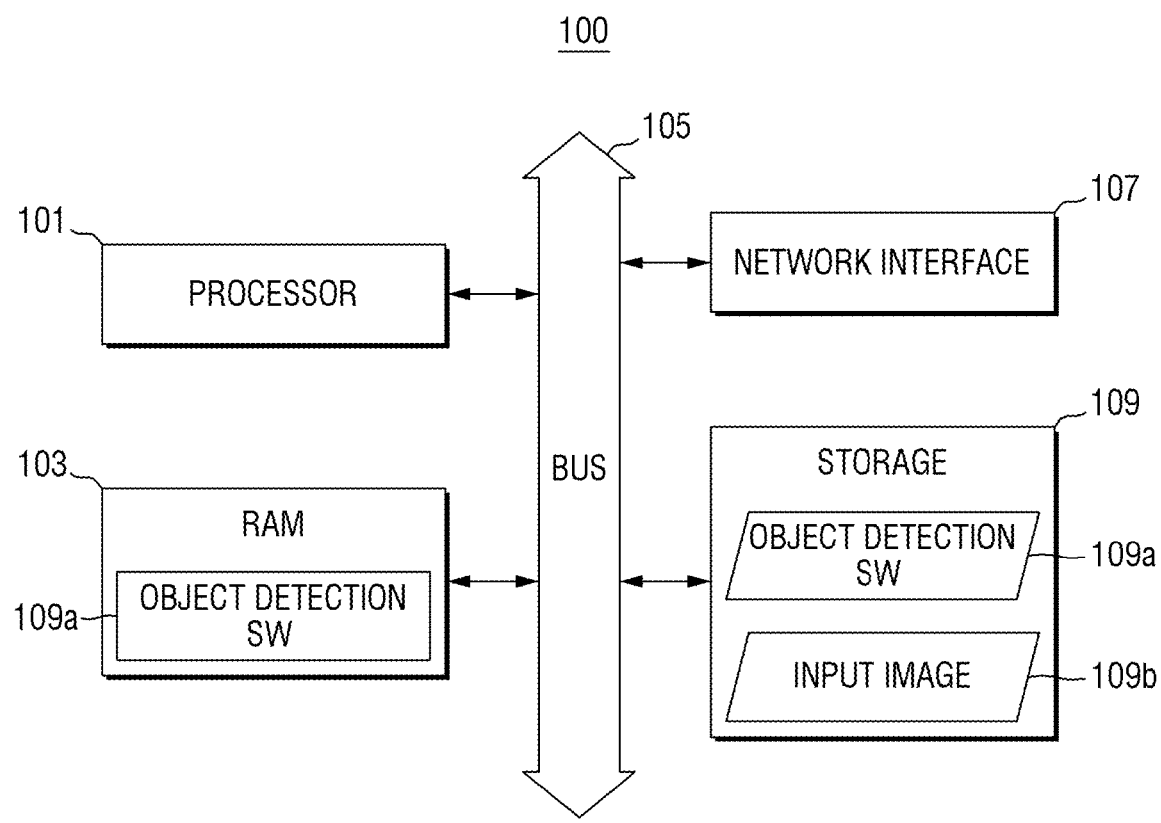
FIG. 6 illustrates the hardware configuration of a machine learning-based object detection apparatus according to an embodiment.

FIG. 6 illustrates the hardware configuration of a machine learning-based object detection apparatus 100 according to an embodiment.

Referring to FIG. 6, the machine learning-based object detection apparatus 100 may include one or more processors 101, a bus 105, a network interface 107, a memory 103 which loads a computer program to be executed by the processors 101, and a storage 109 which stores machine learning-based object detection software 109*a*. In FIG. 6, only the components related to the embodiment are illustrated. Therefore, it will be understood by those of ordinary skill in the art to which the present disclosure pertains that other general-purpose components can be included in addition to the components illustrated in FIG. 6.

The processors 101 control the overall operation of each component of the machine learning-based object detection apparatus 100. The processors 101 may include a central processing unit (CPU), a micro-processor unit (MPU), a micro-controller unit (MCU), a graphic processing unit (GPU), or any form of processor well known in the art to which the present disclosure pertains. In addition, the processors 101 may perform an operation on at least one application or program for executing a method according to embodiments. The machine learning-based object detection apparatus 100 may include one or more processors.

The memory 103 stores various data, commands and/or information. The memory 103 may load one or more programs 109*a* from the storage 109 in order to execute a machine learning-based object detection method according to embodiments. In FIG. 6, a random access memory (RAM) is illustrated as an example of the memory 103.

The bus 105 provides a communication function between the components of the machine learning-based object detection apparatus 100. The bus 105 may be implemented as various forms of buses such as an address bus, a data bus and a control bus.

The network interface 107 supports wired and wireless Internet communication of the machine learning-based object detection apparatus 100. In addition, the network interface 107 may support various communication methods other than Internet communication. To this end, the network interface 107 may include a communication module well known in the art to which the present disclosure pertains.

Figure 7:
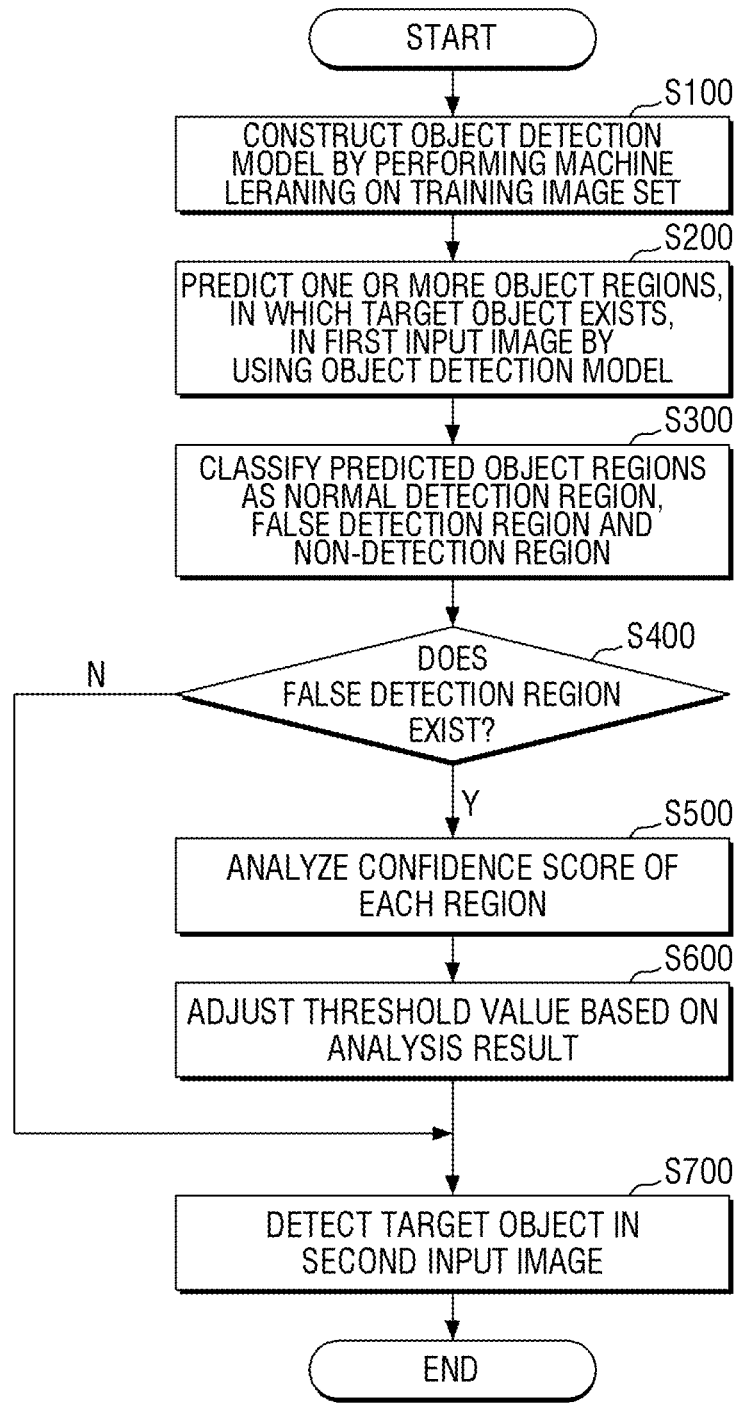
FIG. 7 is a flowchart illustrating a machine learning-based object detection method according to an embodiment.

The storage 109 may non-temporarily store the programs 109*a* and an input image 109*b*. In FIG. 7, the machine learning-based object detection software 109*a* is illustrated as an example of the programs 109*a*.

The storage 109 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The machine learning-based object detection software 109a may perform a machine learning-based object detection method according to an embodiment which will be described later. For example, the machine learning-based object detection software 109a may be loaded into the memory 103 and executed by the processors 101 to perform an operation of constructing an object detection model by performing machine learning on a training image set, wherein the object detection model is a model for detecting a target object in an input image based on the result of comparing a confidence score for the target object with a threshold value; an operation of obtaining an input image given a detection result for the target object, wherein the obtained input image is an image not included in the training image set; an operation of predicting one or more object regions, in which the target object exists, in the obtained input image by using the object detection model; an operation of classifying a region not matching the detection result among the predicted object regions as a false detection region; and an operation of adjusting the threshold value of the object detection model based on a confidence score of the false detection region.

Until now, the configuration and operation of the machine learning-based object detection apparatus 100 according to the embodiment have been described with reference to FIGS. 2 through 6. A machine learning-based object detection method according to an embodiment will now be described in detail with reference to FIGS. 7 through 9E.

Each operation of the machine learning-based object detection method according to the embodiment described below may be performed by a computing apparatus. The computing apparatus may be, for example, the object detection apparatus 100. However, the subject of each operation included in the machine learning-based object detection method may be omitted for ease of description. In addition, each operation of the machine learning-based object detection method may be implemented as each operation of the machine learning-based object detection software 109a.

FIG. 7 is a flowchart illustrating a machine learning-based object detection method according to an embodiment. However, this is merely an embodiment for achieving the objectives of the present disclosure, and some operations can be added or removed as needed.

Referring to FIG. 7, in operation S100, an object detection model is constructed through machine learning on a training image set. For example, if a target object is a face, an object detection model may be constructed through machine learning based on the AdaBoost algorithm. However, the target object detected by the object detection model and/or the type of algorithm used for machine learning can vary.

In addition, in operation S100, a threshold value used as a criterion for detecting the target object may be determined through machine learning. The object detection model may detect an object region, in which the target object exists, in an input image based on a region where a confidence score is equal to or greater than the threshold value. The threshold value may be determined to be a confidence score having a confidence level of, e.g., 90%, 95%, or 99%. However, this is merely an example, and the threshold value can be determined in any way.

Once the object detection model is constructed, the target object can be detected in an input image. However, if the object detection model is applied to a new unlearned environment, false detection of the target object may occur frequently. Therefore, according to the embodiment, the process of adjusting the threshold value through operations S200 through S600 may be performed before the object detection model constructed through operation S100 is applied to the new unlearned environment. The process of adjusting the threshold value will now be described.

In operation S200, one or more object regions in which the target object exists are predicted in an input image (hereinafter, referred to as a "first input image") not included in the training image set by using the object detection model. Here, the first input image is an image given a detection result for the target object.

For better understanding, the process of predicting an object region using the object detection model when the target object is the face will be further described with reference to FIGS. 8A through 8F. In particular, it is assumed that an object detection model illustrated in FIGS. 8A through 8F has been implemented as a plurality of classifiers configured in a cascade structure.

Figure 8A:
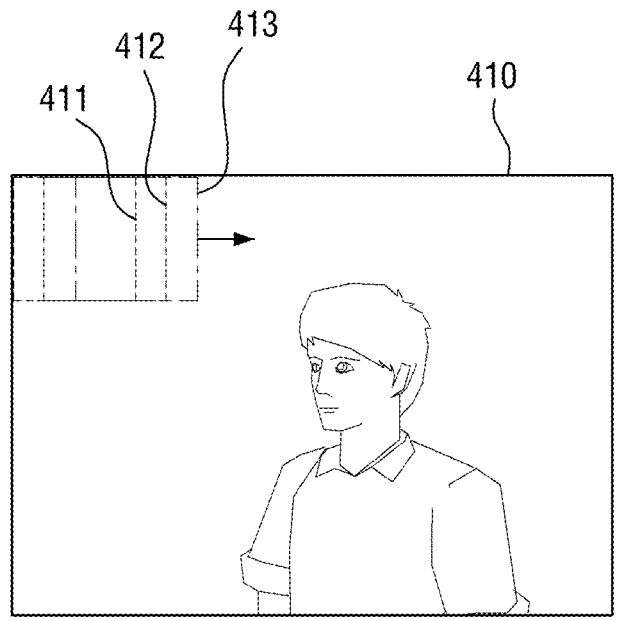
FIGS. 8A through 8F are diagrams illustrating the process of detecting an object region, in which a target object exists, in an input image according to an embodiment.

When an input image is given, the object detection apparatus 100 inputs each window region into the object detection model in a sliding window manner as illustrated in FIG. 8A. In addition, the object detection model outputs, for each region, a confidence score for the target object. For example, each classifier constituting the object detection model may output a first confidence score for a first window region 411 of an input image 410 and, similarly, output second and third confidence scores for second and third window regions 412 and 413. The description will be continued below using the object detection model as the subject.

Figure 8B:
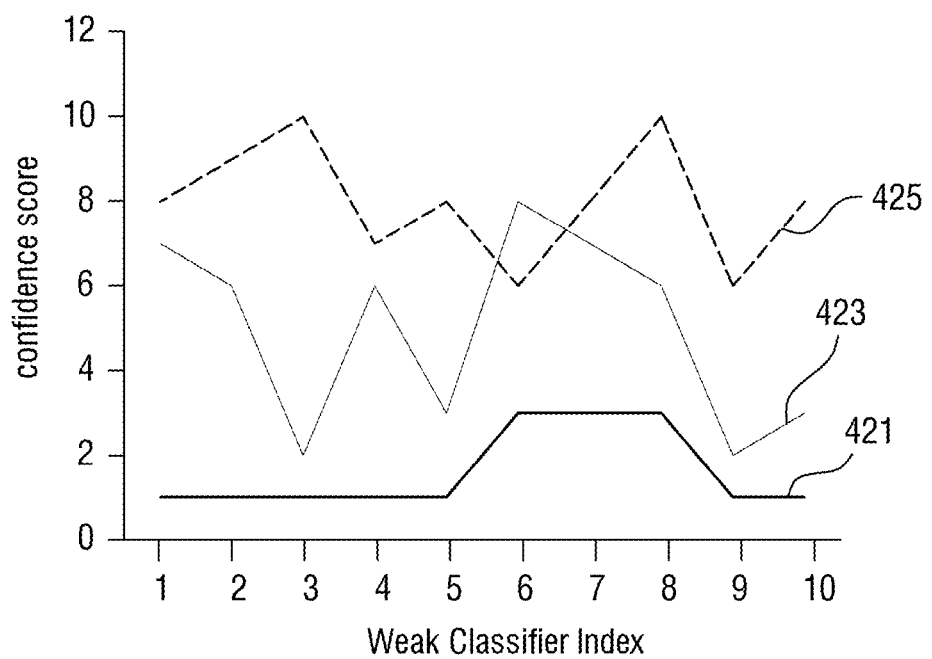
Figure 8C:
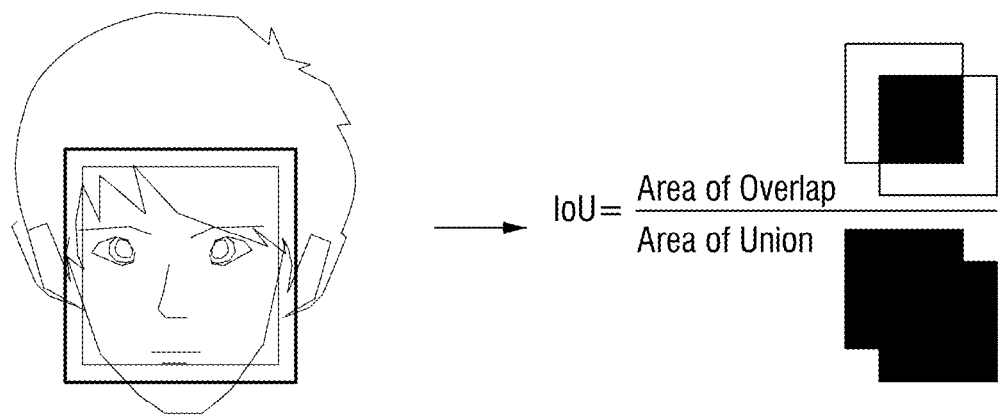

Next, the object detection model detects a region where the output confidence score is equal to or greater than the threshold value as a candidate object region. For example, when a plurality of classifiers are configured in a cascade structure, a region where confidence scores 423 and 425 output respectively from the classifiers are all equal to or greater than a threshold value 421 as illustrated in FIG. 8B may be detected as a candidate object region. For another example, when a plurality of classifiers are not configured in a cascade structure, a candidate object region may be detected based on the result of comparing a representative value (e.g., a mean, a mode or a median) of confidence scores with the threshold value. However, the above examples are intended to illustrate some embodiments of the present disclosure, and the present disclosure is not limited to these examples.

Next, the object detection model groups together n or more (where n is a natural number equal to or greater than 1) candidate object regions satisfying a predefined condition among a plurality of detected candidate object regions. Here, the predefined condition may be a condition based on, for example, an intersection over union (IoU). The concept of the IoU can be understood from FIG. 8C. Since the concept of the IoU is apparent to those skilled in the art, a description thereof will be omitted.

Figure 8D:
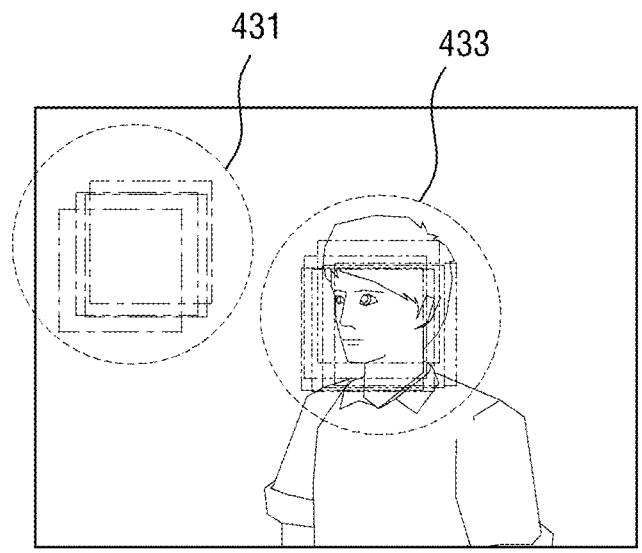

Specifically, for example, when the predefined condition is an IoU of "50%" or more and n is 3, the object detection model places three or more candidate object regions having an IoU of 50% or more in one group. Grouping results 431, 433 of the object detection model in the above example are illustrated in FIG. 8D.

Here, the value of n may be a preset fixed value or a variable value that varies depending on the situation. For example, the value of n may be a variable value that is set to a larger value as the required level of accuracy of object detection is higher.

Figure 8E:
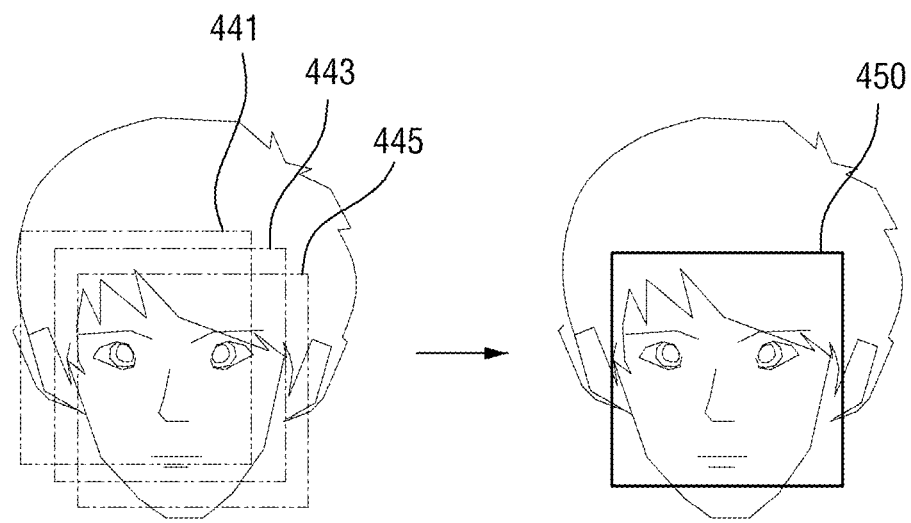
Figure 8F:
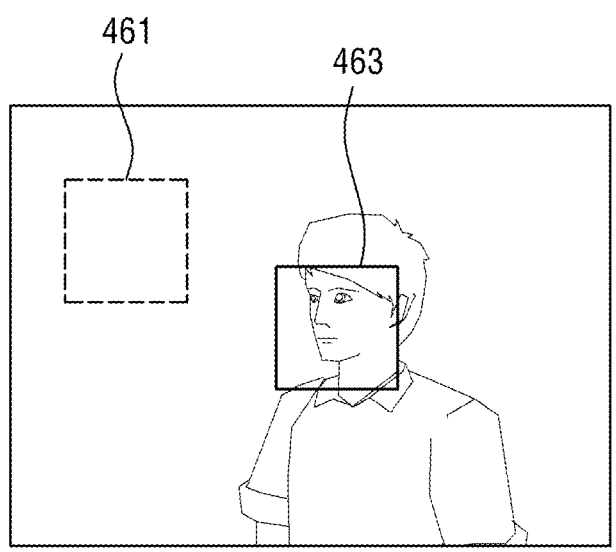

Next, the object detection model determines an object region by performing post-processing on the grouped candidate object regions. The post-processing may be, for example, a series of processes for matching a plurality of candidate object regions 441, 443 and 445 as illustrated in FIG. 8E. Through the post-processing, the position of an object region 450 can be accurately determined. FIG. 8F illustrates results 461 and 463 of the post-processing performed on the grouped candidate object regions 431 and 433 of FIG. 8D.

Referring again to FIG. 7, in operation S300, each of the object regions predicted in operation S200 is classified as a normal detection region, a false detection region, or a non-detection region based on the result of comparing the object region with the given detection result. The detection result denotes a result (e.g., ground truth) of accurately detecting an object region in which the target object exists. For example, as illustrated in FIG. 8F, an object region 461 not matching a given detection result is classified as a false detection region, and an object region 463 matching the detection result is classified as a normal detection region.

In operation S400, it is determined whether there is a false detection region. If it is determined that there is no false detection region, subsequent operations S500 and S600 are not performed, and the target object may be immediately detected in an input image (hereinafter, referred to as a "second input image") not given the detection result for the target object.

If it is determined that there is a false detection region, the confidence score of each region is analyzed in operation S500. For example, the analysis may include the process of obtaining a maximum, minimum, $k^{th}$ (where k is a natural number equal to or greater than 1) confidence score for object detection regions or a region having the confidence score. For another example, when each object region includes a plurality of candidate object regions, the analysis may include the process of obtaining a maximum, minimum, $k^{th}$ confidence score for the candidate object regions associated with the object region or a candidate object region having the confidence score. However, the above examples are intended to illustrate some embodiments of the present disclosure, and the present disclosure is not limited to these examples.

In operation S600, the threshold value is adjusted based on the analysis result of operation S500. Operations S500 and S600 will be described in more detail later.

In operation S700, the target object may be detected in the second input image using the adjusted threshold value. Since the object detection process in operation S700 is performed using the adjusted threshold value, false detection of the target object can be reduced. The reason why false detection can be reduced will be clearly understood with reference to the following description.

A method by which the object detection apparatus 100 adjusts the threshold value of the object detection model based on the result of analyzing the confidence score of each region will now be described. Further, it should be noted that one or more embodiments described below can be combined in various forms to adjust the threshold value of the object detection model.

In an embodiment, the threshold value may be adjusted based on the analysis result of a confidence score of a false detection region. For example, it is assumed that a maximum confidence score among respective confidence scores of a plurality of false detection regions is obtained as an analysis result. In this case, the threshold value may be adjusted to have a value higher than the maximum confidence score. For another example, it is assumed that a false detection region is composed of n or more candidate object regions satisfying a pre-specified condition and that a first confidence score which is $n^{th}$ highest among respective confidence scores of the candidate object regions and a second confidence score which is $(n-1)^{th}$ highest are obtained as an analysis result. In this case, the threshold value may be adjusted to a value between the first confidence score and the second confidence score. This is because the object detection model does not group less than n candidate object regions into one object region in the current example. However, the above examples are intended to illustrate some embodiments of the present disclosure, and the present disclosure is not limited to these examples.

In an embodiment, the threshold value may be adjusted based on an analysis result of a confidence score of a normal detection region and an analysis result of a confidence score of a false detection region. For example, it is assumed that a maximum confidence score of the false detection region and a minimum confidence score of the normal detection region are obtained as an analysis result. In this case, the threshold value may be adjusted to a value between the maximum confidence score and the minimum confidence score. For another example, it is assumed that each of the false detection region and the normal detection region is composed of n or more candidate object regions satisfying a pre-specified condition. In this case, a first value may be determined between a $(1-1)^{th}$ confidence score which is $n^{th}$ highest among confidence scores of the candidate object regions constituting the false detection region and a $(1-2)^{th}$ confidence score which is $(n-1)^{th}$ highest. In addition, a second value may be determined between a $(2-1)^{th}$ confidence score which is $n^{th}$ lowest among confidence scores of the candidate object regions constituting the normal detection region and a $(2-2)^{th}$ confidence score which is $(n+1)^{th}$ lowest. Then, the threshold value may be adjusted to a value between the first value and the second value. If the threshold value located between the first value and the second value is used, the normal detection region will still be detected, but the false detection region will not be detected. However, the above examples are intended to illustrate some embodiments of the present disclosure, and the present disclosure is not limited to these examples.

The process of adjusting the threshold value in a case where the object detection model is implemented as a plurality of classifiers configured in a cascade structure and where each of the normal detection region and the false detection region is composed of n or more candidate object regions will now be described with reference to FIGS. 9A through 9E.

Figure 9A:
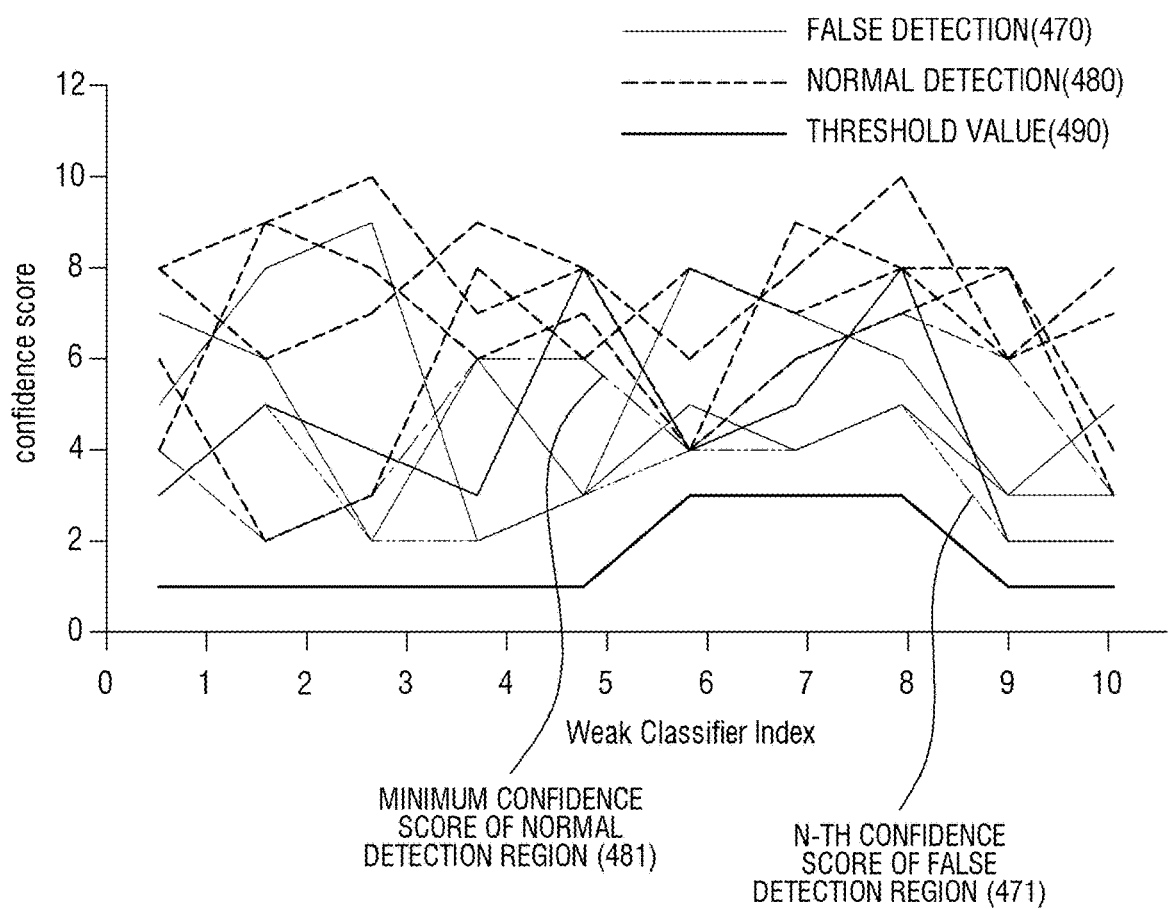
FIGS. 9A through 9E are diagrams illustrating the process of adjusting a threshold value of an object detection model based on the analysis result of a confidence score of each region according to an embodiment.
Figure 9B:
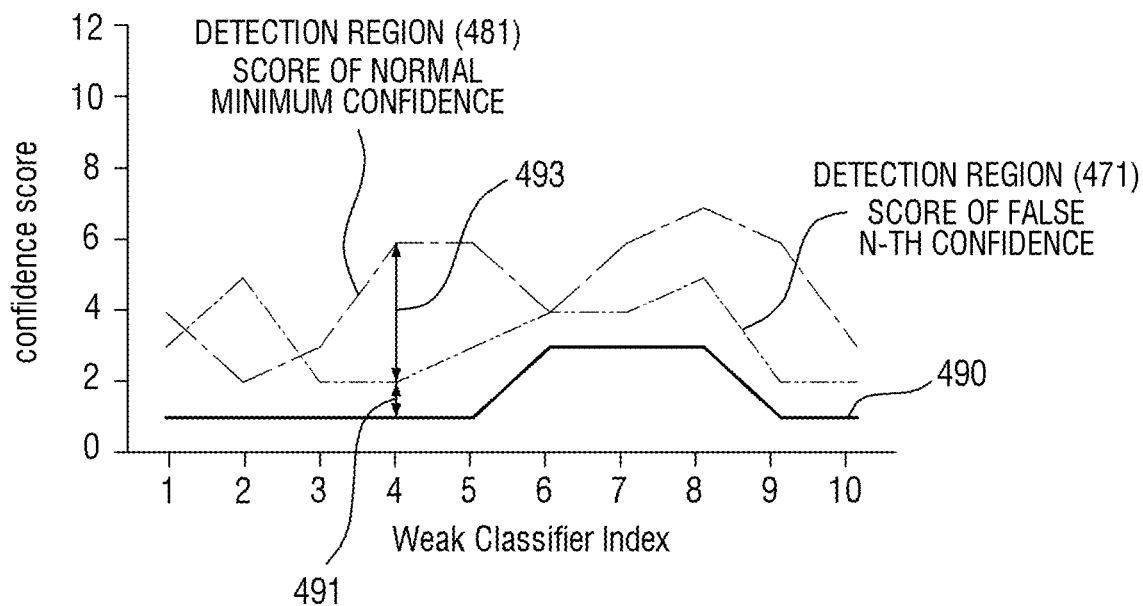
Figure 9C:
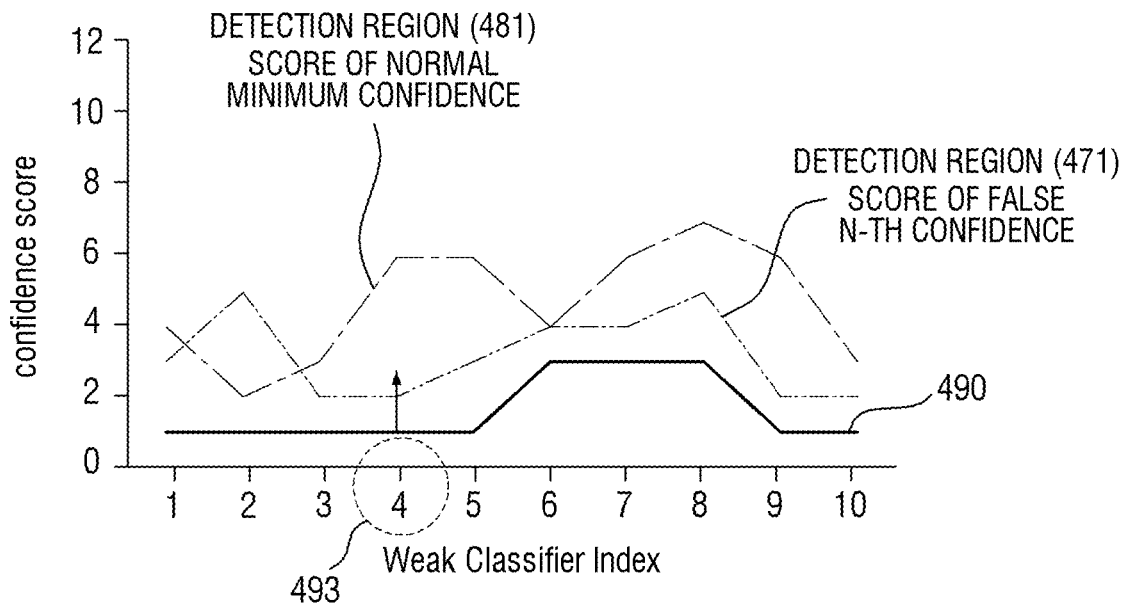

FIG. 9A illustrates each classifier's confidence score for each region in the form of a graph. The x-axis of the graph indicates the index of each classifier, and the y-axis indicates the confidence score. In addition, a linear graph 470 illustrated as a legend indicates each classifier's confidence score for a false detection region, a linear graph 480 indicates each classifier's confidence score for a normal detection region, and a linear graph 490 indicates a threshold value of each classifier.

Referring to FIG. 9A, a candidate object region (hereinafter, referred to as a "first candidate object region") having a minimum confidence score (a dotted line graph 481) among a plurality of candidate object regions constituting the normal detection region is determined through the analysis of the confidence score of each region. The first candidate object region may be determined to be a region having a minimum representative value (e.g., a mean, a mode or a median) of respective confidence scores of the classifiers. However, the scope of the present disclosure is not limited to this example.

Next, a candidate object region (hereinafter, referred to as a "second candidate object region") having an $n^{th}$ highest confidence score (a dotted line graph 471) among a plurality of candidate object regions constituting the false detection region is determined.

Next, at least one target classifier whose threshold value is to be adjusted is selected from the classifiers. In an example, if the classifiers are configured in a cascade structure, any one target classifier whose threshold value is to be adjusted may be selected. In another example, if the classifiers are not configured in a cascade structure, at least one target classifier may be set. For ease of description, the process of selecting a target classifier in a case where the classifiers are configured in a cascade structure will now be described.

In an embodiment, a target classifier may be selected based on the difference between the confidence score of the second candidate object region and the threshold value. Specifically, the difference between the confidence score of the second candidate object region and the threshold value may be calculated for each classifier, and a classifier having the smallest difference may be selected as the target classifier.

In an embodiment, the target classifier may be selected based on the difference between the confidence score of the first candidate object region and the threshold value and/or the difference between the confidence score of the first candidate object region and the confidence score of the second candidate object region. Specifically, the difference between the confidence score of the first candidate object region and the confidence score of the second candidate object region may be calculated for each classifier, and a classifier having the smallest difference may be selected as the target classifier.

In an embodiment, the target classifier may be selected by comprehensively considering the selection criteria used in the embodiments described above. For example, referring to FIG. 9B, the target classifier may be selected by comprehensively considering a difference 493 between a confidence score 481 of the first candidate object region and a confidence score 471 of the second candidate object region and a difference 491 between the confidence score 471 of the second candidate object region and a threshold value 490 (for example, an arithmetic mean or a weighted mean of the two differences). Accordingly, referring to FIG. 9C, a classifier 493 indicated by index 4 may be selected as the target classifier.

Figure 9D:
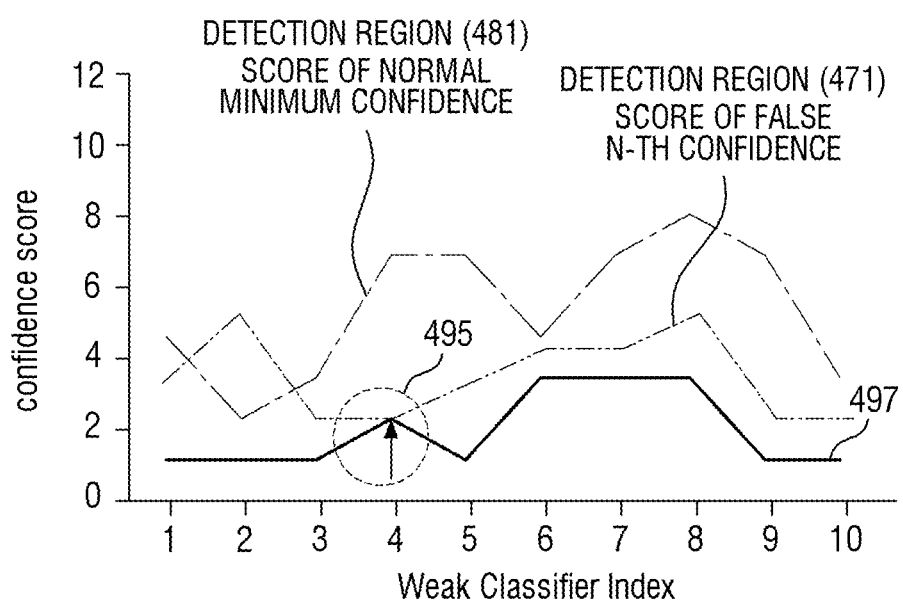

Next, the threshold value of the selected target classifier may be adjusted. For example, the adjusted threshold value may be a value between the confidence score of the first candidate object region and the confidence score of the second candidate object region. However, the above example is intended to illustrate some embodiments of the present disclosure, and the present disclosure is not limited to this example. In FIG. 9D, a case where the threshold value of the target classifier 493 is adjusted is illustrated as an example. Referring to a dotted line area 495, it can be seen that the threshold value of the classifier 493 has been adjusted to a value larger than the confidence score 471 of the second candidate object region and smaller than the confidence score 481 of the first candidate object region.

Figure 9E:
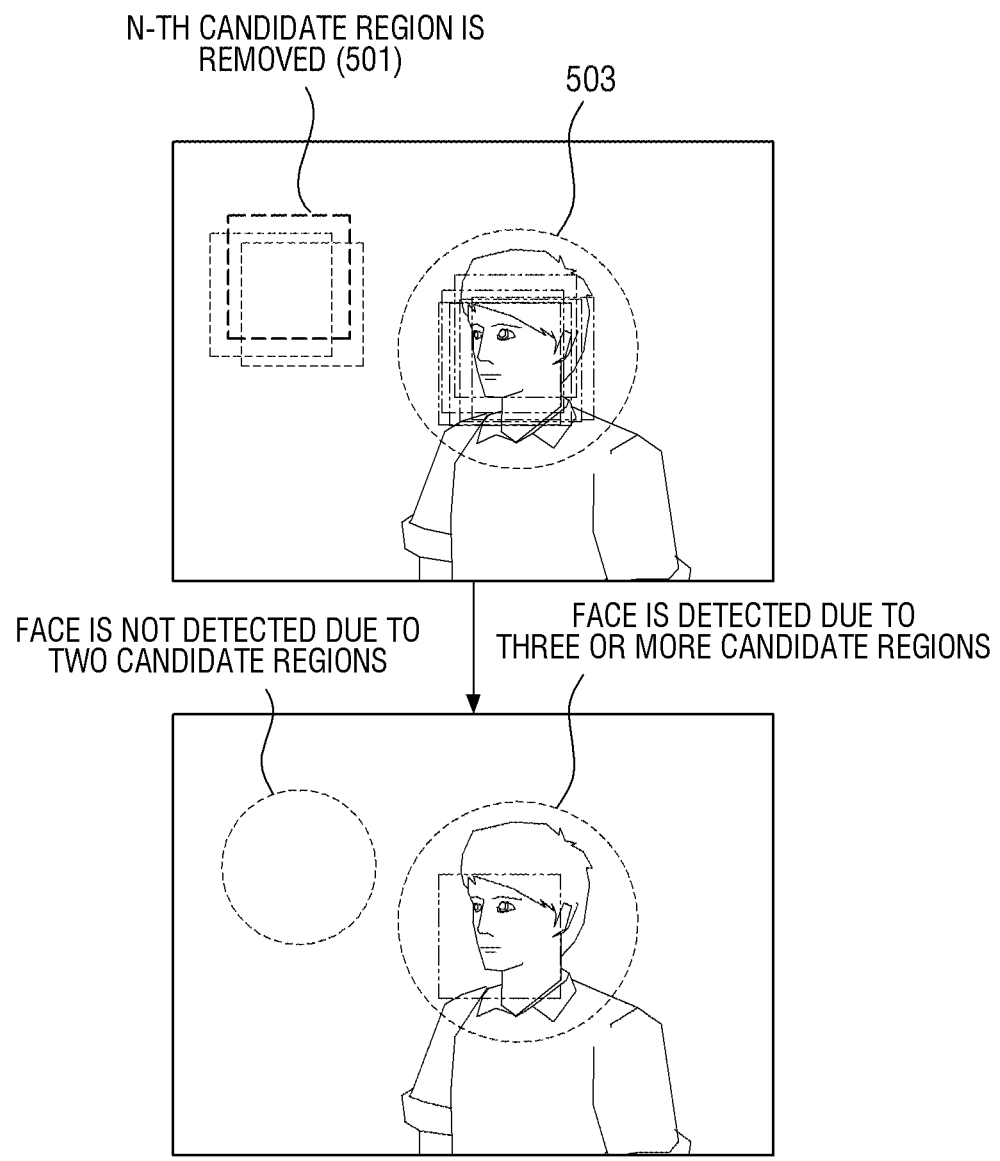

FIG. 9E illustrates an example of performing object detection on a second input image not given a detection result by using an adjusted threshold value. In particular, in FIG. 9E, it is assumed that an object region is composed of "3" (i.e., n=3) or more candidate object regions satisfying a pre-specified condition (e.g., an IoU of 50% or more).

Referring to FIG. 9E, since the adjusted threshold value is higher than a confidence score of a third candidate object region, a third (or higher) candidate object region 501 that has been detected previously is no longer detected as a candidate object region. That is, since only two candidate object regions are detected in an existing false detection region, the existing false detection region is no longer detected as an object region. On the other hand, three or more candidate object regions 503 may still be detected in an existing normal detection region. Thus, a false positive error in which a target object is falsely detected can be reduced.

Until now, the method of adjusting a threshold value according to the embodiment has been described with reference to FIGS. 9A through 9E. According to the above-described method, false detection of a target object can be prevented without retraining by fine-tuning a threshold value of each classifier according to the application environment. Therefore, more than a certain level of accuracy and reliability of target object detection can be guaranteed even in a new environment.

According to embodiments, the object detection model may be retrained under certain conditions. An example in which the object detection model is retrained will now be described.

In an embodiment, if a non-detection region is found to exist as a result of performing target object detection in operation S200, the object detection model may be retrained. This embodiment will now be described with reference to FIGS. 10 and 11.

Figure 10:
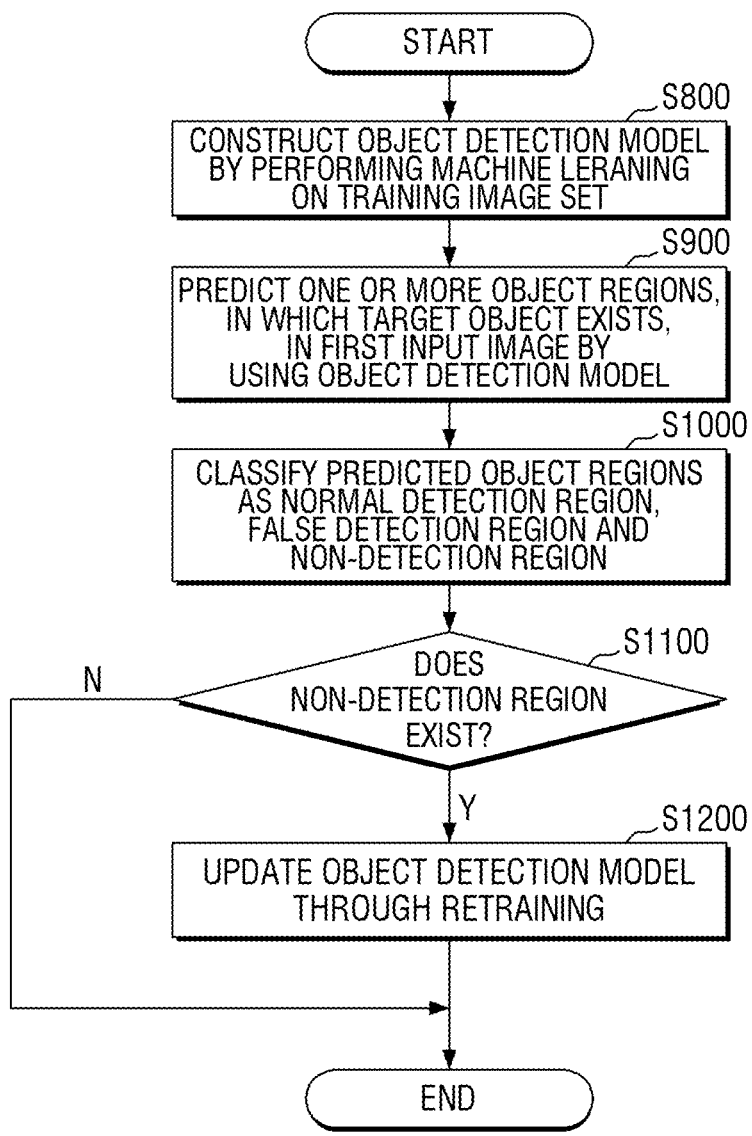
FIG. 10 is a flowchart illustrating a method of retraining an object detection model according to an embodiment.

FIG. 10 is a flowchart illustrating a method of retraining an object detection model according to an embodiment. However, this is merely an embodiment for achieving the objectives of the present disclosure, and some operations can be added or removed as needed.

Referring to FIG. 10, the object detection apparatus 100 predicts an object region in an input image given a detection result for a target object by using a pre-trained object detection model (operations S800 and S900). In addition, the object detection apparatus 100 determines whether there is a non-detection region using the detection result given in advance (operations S1000 and S1100). Operations S800 through S1000 are the same as the above-described operations S100 through S300, and thus a further description will be omitted.

In response to the determination that there is the non-detection region, the object detection model is retrained in operation S1200. Specifically, machine learning is performed on the input image given the detection result, thereby updating the object detection model.

According to an embodiment, a data augmentation operation may be performed to generate a training image for retraining. For example, a plurality of training images may be generated by cropping the non-detection region in the input image and performing a data augmentation operation illustrated in FIG. 11. However, the above example is intended to illustrate some embodiments of the present disclosure, and the present disclosure is not limited to this example. In the current embodiment, the object detection model may be updated through machine learning on the training images. Accordingly, a false negative error in which a target object is not detected can be reduced.

However, depending on embodiments, when there is no false detection region and only the non-detection region exists, the object detection apparatus 100 may not perform retraining and solve the non-detection problem by adjusting a threshold value to a value lower than a confidence score of the non-detection region.

According to an embodiment, the object detection model may be retrained even if there is no non-detection region. Specifically, if the analysis result of operation S500 indicates that a confidence score of a false detection region is higher than a confidence score of a normal detection region, the object detection apparatus 100 may perform machine learning on an input image given a detection result without adjusting a threshold value. Here, similarly to the above, a data augmentation operation may be performed on the false detection region and/or the normal detection region to generate a plurality of training images, and machine learning may be performed on the training images. In the current embodiment, the threshold value of the object detection model may be adjusted only when the confidence score of the false detection region is lower than the confidence score of the normal detection region.

Figure 11:
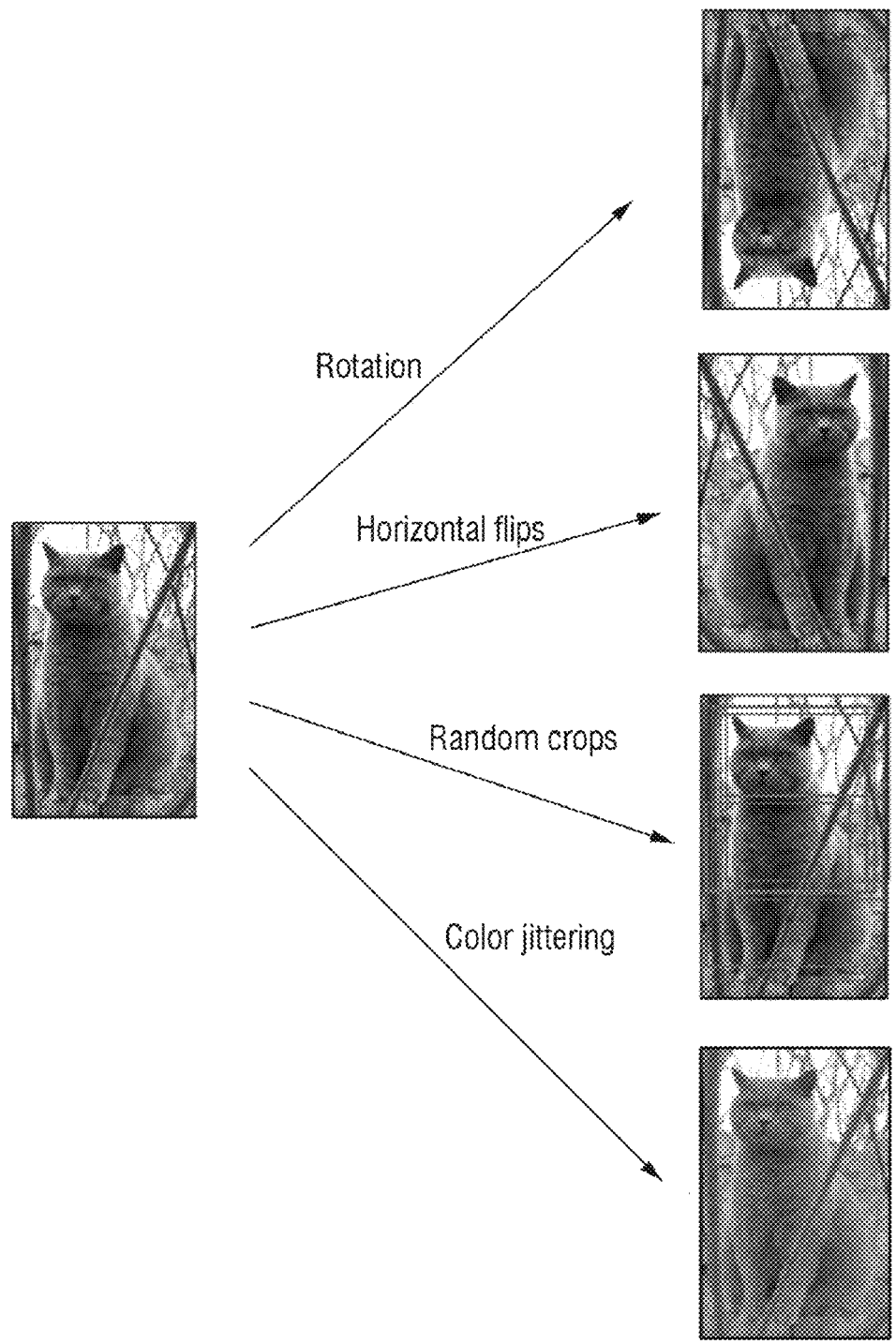
FIG. 11 is a diagram illustrating a data augmentation operation that can be referred to in some embodiments.

Until now, the method of retraining an object detection model according to the embodiment has been described with reference to FIGS. 10 and 11. According to the above-described method, a false negative error in which a target object is not detected can also be reduced.

According to the embodiments described above, a target classifier whose threshold value is to be adjusted and an optimum threshold value are determined. Accordingly, a threshold value of an object detection model can be fine-tuned for each application environment, and more than a certain level of accuracy and reliability of target object detection can be guaranteed even in a new environment without retraining. In particular, a false positive error in which a target object is falsely detected can be reduced.

In addition, the time cost and computing cost required for retraining can be reduced.

Further, if the present disclosure is applied to an intelligent image analysis system, the overall system performance can be improved as false detection of the target object is reduced.

Also, the object detection model can be retrained when the target object is not detected. Accordingly, a false negative error in which the target object is not detected can also be reduced.

However, the effects of the embodiments are not restricted to the one set forth herein. The above and other effects of the embodiments will become more apparent to one of daily skill in the art to which the embodiments pertain by referencing the claims.

The concepts of the disclosure described above with reference to FIGS. 1 to 11 can be embodied as computer-readable code on a computer-readable medium. The computer-readable medium may be, for example, a removable recording medium (a CD, a DVD, a Blu-ray disc, a USB storage apparatus, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A machine learning-based object detection method performed by an object detection apparatus, the method comprising:

constructing an object detection model by performing machine learning on a training image set, wherein the object detection model is a model for detecting a target object in an input image based on the result of comparing a confidence score for the target object with a threshold value;

obtaining an input image given a detection result for the target object, wherein the obtained input image is an image not included in the training image set;

predicting one or more object regions, in which the target object exists, in the obtained input image by using the object detection model;

classifying a region not matching the detection result among the predicted object regions as a false detection region; and adjusting the threshold value of the object detection model based on a confidence score of the false detection region, wherein the predicting the object regions in which the target object exists in the obtained input image comprises:

determining a plurality of candidate object regions, in each of which the confidence score for the target object is equal to or greater than the threshold value, in the obtained input image;

placing n or more candidate object regions, which satisfy a predefined condition among the candidate object regions, in each group; and predicting the grouped candidate object regions as an object region, wherein n is a natural number equal to or greater than 2, wherein the false detection region comprises n or more grouped candidate object regions, wherein the adjusting the threshold value of the object detection model comprises adjusting the threshold value of the object detection model using a first value, wherein the first value is determined between n-th highest confidence score and the highest confidence score among confidence scores of candidate object regions constituting the false detection region.

2. The method of claim 1, further comprising classifying a region matching the detection result among the predicted object regions as a normal detection region, wherein the adjusting the threshold value of the object detection model comprises adjusting the threshold value of the object detection model based on a confidence score of the normal detection region and the confidence score of the false detection region.

3. The method of claim 1, wherein the first value is a value lower than (n−1)-th highest confidence score among the confidence scores of candidate object regions constituting the false detection region.

4. The method of claim 1, wherein the object detection model comprises a plurality of classifiers, each classifying each region of an input image as an object region or a non-object region based on the result of comparing a threshold value and a confidence score, and further comprising classifying a region matching the detection result among the predicted object regions as a normal detection region, and
wherein the adjusting the threshold value of the object detection model comprises:
selecting a target classifier whose threshold value: is to be adjusted from the classifiers based on a difference between a confidence score of the normal detection region and the confidence score of the false detection region output from each of the classifiers; and
adjusting the threshold value of the selected target classifier.

5. The method of claim 1, wherein the object detection model comprises a plurality of classifiers, each classifying each region of an input image as an object region or a non-object region based on the result of comparing a threshold value and a confidence score, and
the adjusting the threshold value of the object detection model comprises:
selecting a target classifier whose threshold value is to be adjusted from the classifiers based on a difference between the threshold value of each classifier and the confidence score of the false detection region output from each classifier; and
adjusting the threshold value of the selected target classifier.

6. The method of claim 1, wherein the object detection model comprises a plurality of classifiers, each classifying each region of an input image as an object region or a non-object region based on the result of comparing a threshold value and a confidence score, and
wherein the adjusting the threshold value of the object detection model comprises:
selecting any one target classifier whose threshold value is to be adjusted from the classifiers; and
adjusting the threshold value of the selected target classifier,
wherein the plurality of classifiers are configured in a cascade structure.

7. The method of claim 1, wherein the target object is a face, and the machine learning is performed through an AdaBoost algorithm.

8. The method of claim 1, further comprising:
determining whether a non-detection region undetected by the object detection model exists in the obtained image based on the detection result; and
updating the object detection model by performing machine learning on the obtained input image in response to the determination that the non-detection region exists.

9. The method of claim 1, further comprising classifying a region matching the detection result among the predicted object regions as a normal detection region, and
wherein the adjusting the threshold value of the object detection model comprises adjusting the threshold value of the object detection model in response to determining that the confidence score of the false detection region is lower than a confidence score of the normal detection region.

10. The method of claim 1, further comprising determining whether a non-detection region undetected by the object detection model exists in the obtained image based on the detection result, and
wherein the adjusting the threshold value of the object detection model comprises adjusting the threshold value of the object detection model to a value lower than a confidence score of the non-detection region in response to determining that the non-detection region exists and the classification result indicates that the false detection region does not exist.

11. The method of claim 2, wherein the adjusting the threshold value of the object detection model based on the confidence score of the normal detection region and the confidence score of the false detection region comprises:
determining a first confidence score indicating a minimum score among confidence scores of the normal detection region;
determining a second confidence score indicating a maximum score among confidence scores of the false detection region; and
adjusting the threshold value of the object detection model to any one value located between the first confidence score and the second confidence score.

12. The method of claim 3, wherein the threshold value of the object detection model is adjusted to a value between the first value and a second value,
wherein the second value is determined between k-th lowest confidence score and the lowest confidence score among confidence scores of candidate object regions constituting a normal detection region,
wherein k is a natural number equal to or greater than 2.

13. The method of claim 5, wherein when n or more candidate object regions satisfying a predefined condition are grouped together to form the false detection region, the selecting the target classifier whose threshold value is to be adjusted comprises:
determining an n-th confidence score among confidence scores of the n or more candidate object regions; and
selecting thy: target classifier from the classifiers based on a difference between the threshold value of each classifier and the determined n-th confidence score,
wherein n is a natural number equal to or greater than 1.

14. The method of claim 6, further comprising classifying a region matching the detection result among the predicted object regions as a normal detection region, and
wherein the selecting of the any one target classifier whose threshold value is to be adjusted from the classifiers comprises selecting the target classifier based on at least one of a first difference between the threshold value of each classifier and the confidence score of the false detection region output from each classifier and a second difference between a confidence score of the normal detection region and the confidence score of the false detection region output from each classifier.

15. The method of claim 8, wherein the updating the object detection model comprises:
generating a plurality of ages by performing data augmentation on an image matching the non-detection region; and
updating the object detection model by performing machine learning on the generated images.

16. The method of claim 14, further comprising updating the object detection model by performing machine learning on the obtained input image in response to determining that the confidence score of the false detection region is higher than the confidence score of the normal detection region.

17. An object detection apparatus comprising:
a hardware processor; and
a memory configured to store one or more programs executed by the hardware processor, wherein the programs comprise instructions which, when executed by the hardware processor, cause the hardware processors to perform:
constructing an object detection model by performing machine learning on a training image set, wherein the object detection model is a model for detecting a target object in an input image based on the result of comparing a confidence score for the target object with a threshold value;
obtaining an input image given a detection result for the target object wherein the obtained input image is an image not included in thy: training image set,
predicting one or more object regions, in which the target object exists, in the obtained input image by using the object detection model;
classifying a region not matching the detection result among the predicted object regions as a false detection region; and
adjusting the threshold value of the object detection model based on a confidence score of the false detection region,
wherein the predicting the object regions in which the target object exists in the obtained input image comprises:
determining a plurality of candidate object regions, in each of which the confidence score for the target object is equal to or greater than the threshold value, in the obtained input image;
placing n or more candidate object regions, which satisfy a predefined condition among the candidate object regions, in each group; and
predicting the grouped candidate object regions as an object region,
wherein n is a natural number equal to or greater than 2,
wherein the false detection region comprises n or more grouped candidate object regions,
wherein the adjusting the threshold value of the object detection model comprises adjusting the threshold value of the object detection model using a first value,
wherein the first value is determined between n-th highest confidence score and the highest confidence score among confidence scores of candidate object regions constituting the false detection region.

18. The apparatus of claim 17, wherein the programs further comprise instructions which cause the hardware processors to perform classifying a region matching the detection result among the predicted object regions as a normal detection region, and
wherein the adjusting the threshold value of the object detection model comprises adjusting the threshold value of the object detection model based on a confidence score of the normal detection region and the confidence score of the false detection region.

19. The apparatus of claim 17, wherein the first value is a value lower than (n−1)-th highest confidence score among the confidence scores of candidate object regions constituting the false detection region.

20. A non-transitory computer-readable storage medium that stores a computer program which, when executed by a computing apparatus, causes the computing apparatus to perform:
constructing an object detection model by performing machine learning on a training image set, wherein the object detection model is a model for detecting a target object in an input image based on the result of comparing a confidence score for the target object with a threshold value;
obtaining an input image given a detection result for the target object, wherein the obtained input image is an image not included in the training image set;
predicting one or more object regions, in which the target object exists, in the obtained input image by using the object detection model;
classifying a region not matching the detection result among the predicted object regions as a false detection region; and
adjusting the threshold value of the object detection model based on a confidence score of the false detection region,
wherein the predicting the object regions in which the target object exists in the obtained input image comprises:
determining a plurality of candidate object regions, in each of which the confidence score for the target object is equal to or greater than the threshold value, in the obtained input image;
placing n or more candidate object regions, which satisfy a predefined condition among the candidate object regions, in each group; and
predicting the grouped candidate object regions as an object region,
wherein n is a natural number equal to or greater than 2,
wherein the false detection region comprises n or more grouped candidate object regions,
wherein the adjusting the threshold value of the object detection model comprises adjusting the threshold value of the object detection model using a first value,
wherein the first value is determined between n-th highest confidence score and the highest confidence score among confidence scores of candidate object regions constituting the false detection region.

* * * * *